UNITED STATES PATENT OFFICE 2,572,129

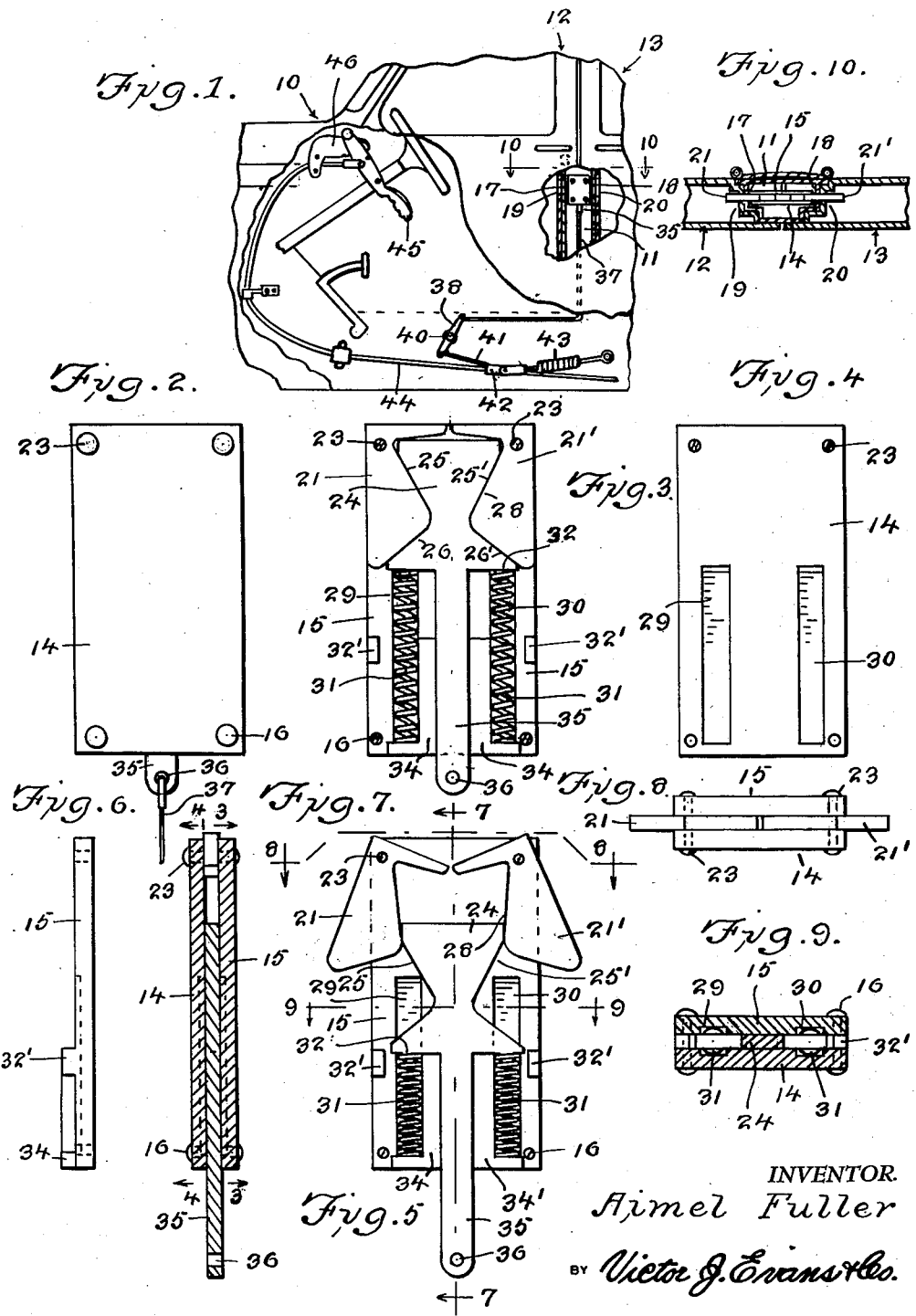

LOCK FOR VEHICLE DOORS

Aimel Fuller, Hawthorne, Calif.

Application April 12, 1949, Serial No. 86,905

2 Claims. (Cl. 292—45)

This invention relates to vehicles, and more particularly to a lock for vehicle doors.

The object of the invention is to provide a lock which will prevent automobile doors from being accidentally opened.

Another object of the invention is to provide an automobile lock mechanism which will ensure that the vehicle doors remain locked while the vehicle is in motion to thereby prevent passengers from accidentally falling out of the vehicle and for preventing anyone from surreptitiously entering the vehicle.

A further object of the invention is to provide a vehicle door lock which is simple and inexpensive to manufacture.

Other objects and advantages will become apparent during the course of the following description.

In the accompanying drawing, forming a part of this application, and in which like numerals are used to designate like parts throughout the same:

Figure 1 is a fragmentary side elevational view of a vehicle with parts broken away and in section and showing the locking mechanism in position in the vehicle, according to the present invention;

Figure 2 is a side elevational view of the door lock;

Figure 3 is a sectional view taken on the line 3—3 of Figure 7;

Figure 4 is a sectional view taken on the line 4—4 of Figure 7;

Figure 5 is a view similar to Figure 3 but showing the position of the parts of the device when the lock is in operation;

Figure 6 is a side elevational view of the back plate;

Figure 7 is a sectional view taken on the line 7—7 of Figure 5;

Figure 8 is a sectional view taken on the line 8—8 of Figure 5;

Figure 9 is a sectional view taken on the line 9—9 of Figure 5; and

Figure 10 is an enlarged sectional view taken on the line 10—10 of Figure 1.

Referring in detail to the drawings, the numeral 10 designates a portion of a vehicle, Figure 1, and the vehicle includes a door post 11 and a pair of doors 12 and 13 which are hingedly connected to the vehicle in the usual manner. The present invention is directed to a locking mechanism for preventing the doors 12 and 13 from being accidentally opened, as when the vehicle is in motion, so that occupants thereof will not accidentally fall out of the moving vehicle.

The locking mechanism comprises a pair of spaced parallel plates 14 and 15 which may be fabricated of any suitable material. The plates are secured together by suitable securing elements such as rivets 16, and the plates 14 and 15 are positioned in the door post 11 and supported by the latter. The door post 11 is provided with a pair of opposed openings or apertures 17 and 18, Figures 1 and 10. The door 12 is provided with an opening 19 which registers with the opening 17 when the door 12 is in closed position. Similarly the door 13 is provided with an opening 20 which registers with the aperture 18 in the opposite side of the door post when the door 13 is in closed position.

A pair of arms 21 and 21' are positioned between the plates 14 and 15, and the arms 21 and 21' are each pivotally connected to the plates by a pin 23. The arm 21 is adapted to move into and out of engagement with the registering apertures 17 and 19 to prevent accidental opening of the door 12, while the arm 21' is likewise adapted to be moved into and out of engagement with the registering apertures 18 and 20 to maintain the door 13 locked at the same time. For causing pivotal movement of the arms 21 and 21', a plunger 24 is provided. The plunger 24, which may have its top recessed, is slidably positioned between the plates 14 and 15 and the plunger 24 is cut away to define a first pair of inclined shoulders 25 and 25', and arranged therebelow is a second pair of inclined shoulders 26 and 26' for a purpose to be later described. Each of the arms 21 and 21' is shaped to define a lip 28.

The plates 14 and 15 are each provided with a pair of spaced longitudinally extending grooves 29 and 30 which coact when the plates are assembled to define chambers for receiving therein coil springs 31. Each of the coil springs 31 are arranged in engagement with a projection 32, there being a pair of the projections 32 extending from the lower end of the plunger 24. The springs 31 normally urge the plunger 24 upwardly into engagement with the lips 28 of the arms 21 and 21' to thereby normally permit the arms to swing out of engagement with the registering openings in the door post and doors to the position shown in Figure 3. A pair of spacer members 32' project from the plate 15 for maintaining the plates 14 and 15 in proper spaced relation.

Arranged between the plates 14 and 15 and secured to the plate 15 is a pair of L-shaped support members 34 and 34' which are adapted to be engaged by the lower end of the plunger 24 and the stem 35 is slidably arranged between the members 34 and 34'. The lower end of the stem 35 is provided with an aperture 36 for receiving an end of an actuating cable 37, Figure 1. The other end of the cable 37 is connected to a lever 38 which is pivotally connected to the vehicle as at 40.

For causing pivotal movement to the lever 38, a link 41 has one of its ends connected to the other end of the lever 38, and the other end of the link 41 is connected to a coupling 42. A coil spring 43 has its ends connected to the coupling 42 and vehicle body respectively, and for causing movement of the coupling 42, a cable 44 has one end connected to the coupling 42. The other end of the cable 44 is connected to a hand or emergency brake 45 which is pivotally supported within the vehicle by a bracket 46.

In operation, when the vehicle is not moving, the emergency brake 45 is pulled backwardly to thereby move the coupling 42 forwardly. This permits the springs 31 to bias the plunger 24 upwardly whereby the arms 21 and 21' will be pivoted out of engagement with the registering openings in the door post and doors so that the doors may be freely and readily opened as desired. When the vehicle is in motion, the brake 45 is pivoted forwardly whereby the spring 43 moves the coupling 42 rearwardly, and this causes a counterclockwise pivotal movement of the lever 38. This movement of the lever 38 causes the cable 37 to pull the plunger 24 downwardly so that its shoulders 25 and 25' cause the arms 21 and 22 to move into engagement with the registering openings in the door and door post. Thus, as long as the car is in motion it will be impossible for a passenger therein to accidentally open the doors and fall out which would result in serious injury. Further, this construction precludes the possibility of anyone surreptitiously gaining access to the car while the car is in motion.

While I have shown and described a preferred form of my invention, this is by way of illustration only and I consider as my own all such modifications in construction as fairly fall within the scope of the appended claims.

I claim:

1. In a locking mechanism, a pair of spaced parallel plates secured together, a pair of arms positioned between said plates and each pivotally connected thereto, a plunger slidably positioned between said plates for causing pivotal movement of said arms, said plunger being cut away to define a first pair of inclined shoulders, and a second pair of inclined shoulders arranged below said first pair of shoulders, said plates being each provided with a pair of spaced longitudinally extending grooves, coil springs seated in said grooves, a pair of projections extending from the lower end of said plunger for engaging said coil springs, a pair of spacer members projecting from one of said plates for maintaining the plates in proper spaced relation, and a pair of L-shaped support members arranged between said plates and adapted to be engaged by the lower end of the plunger.

2. In a locking mechanism, a pair of spaced parallel plates secured together, a pair of arms positioned between said plates and each pivotally connected thereto, a plunger slidably positioned between said plates for causing pivotal movement of said arms, said plunger being cut away to define a first pair of inclined shoulders, and a second pair of inclined shoulders arranged below said first pair of shoulders, said plates being each provided with a pair of spaced longitudinally extending grooves, coil springs seated in said grooves, a pair of projections extending from the lower end of said plunger for engaging said coil springs, a pair of spacer members projecting from one of said plates for maintaining the plates in proper spaced relation, a pair of L-shaped support members arranged between said plates and adapted to be engaged by the lower end of the plunger, and a stem slidably arranged between said pair of support members and secured to said plunger.

AIMEL FULLER.

REFERENCES CITED

The following references are of record in the file of this patent:

UNITED STATES PATENTS

| Number | Name | Date |
|---|---|---|
| 1,995,889 | Landry | Mar. 26, 1935 |
| 2,074,449 | Ziomek | Mar. 23, 1937 |
| 2,096,980 | Schjolin | Oct. 26, 1937 |
| 2,218,435 | Aelschig | Oct. 15, 1940 |
| 2,219,132 | Hohmann et al. | Oct. 22, 1940 |
| 2,250,014 | Fitzgerald | July 22, 1941 |
| 2,254,419 | Castle | Sept. 2, 1941 |